March 9, 1965 R. H. BERGMAN 3,173,021

NEGATIVE RESISTANCE DIODE PULSE AMPLIFIER

Filed Aug. 17, 1960

INVENTOR.
RICHARD H. BERGMAN
BY
Earl V. Olson
ATTORNEY

United States Patent Office 3,173,021

Patented Mar. 9, 1965

3,173,021

NEGATIVE RESISTANCE DIODE PULSE AMPLIFIER

Richard H. Bergman, Riverton, N.J., assignor to Radio Corporation of America, a corporation of Delaware Filed Aug. 17, 1960, Ser. No. 50,115
10 Claims. (Cl. 307—88.5)

This invention relates to circuits including a negative resistance diode, such as a tunnel diode, and more particularly to a circuit which is responsive to an input pulse of one polarity and is operative to generate two output pulses of polarities opposite to each other. The invention is particularly useful in high-speed computer and data processing apparatus, though not limited thereto.

Tunnel diodes have been suggested for use in computers and data processing apparatus because of their small size and because of the very high speed at which they can be switched between low and high voltage states. A tunnel diode circuit biased for monostable operation can be triggered to produce a pulse having a width in the order of one nanosecond (one millimicrosecond, or $10^{-9}$ seconds).

There are many instances in computers and data processing apparatus where it is desired to produce two pulses of like form and of opposite polarity. This has been accomplished by the use of a transformer having a secondary coil with a grounded centertap and two terminals providing opposite polarity output signals. However, at very high speeds of operation where the signal pulse width is in the order of one nanosecond, transformers are unsatisfactory in performance, or at the very least, are extreme difficult to construct. Also, a transformer is a passive device which does not provide signal power again.

It is therefore a general object of this invention to provide an improved circuit operative at very high speeds for producing two pulses of opposite polarity.

It is another object to provide an improved high-speed circuit which generates opposite polarity pulses and provides signal power gain.

It is a further object to provide an improved circuit, including a tunnel diode, for producing opposite polarity pulses which have a desired wave shape and duration that is independent of the input trigger pulse.

In one aspect, the invention comprises a series circuit including an inductor, a tunnel diode and a second inductor. Positive and negative potentials, relative to ground or reference potential, are applied across the series circuit to forwardly bias the tunnel diode. An input pulse is applied to one side of the tunnel diode, and output pulses of polarities opposite to each other are obtained from opposite sides of the diode. The input pulse causes the tunnel diode to switch from the positive resistance region at which it is biased to another positive resistance region, and back again, at a rate determined by the values and characteristics of the circuit elements.

A second circuit may be provided including an inductor, second and third tunnel diodes and another inductor. Positive and negative forward biasing potentials are applied across the circuit with the junction point between the diodes connected to ground. The positive side (that is, the anode) of the first tunnel diode is coupled to the positive side of the second tunnel diode, and the negative side of the first tunnel diode (that is, the cathode) is coupled to the negative side of the third tunnel diode. Amplified opposite polarity pulses are simultaneously available at the positive and negative sides of the second and third diodes, respectively.

These and other objects and aspects of the invention will be apparent from the following more detailed description taken in conjunction with the appended drawing, wherein.

Figure 1:
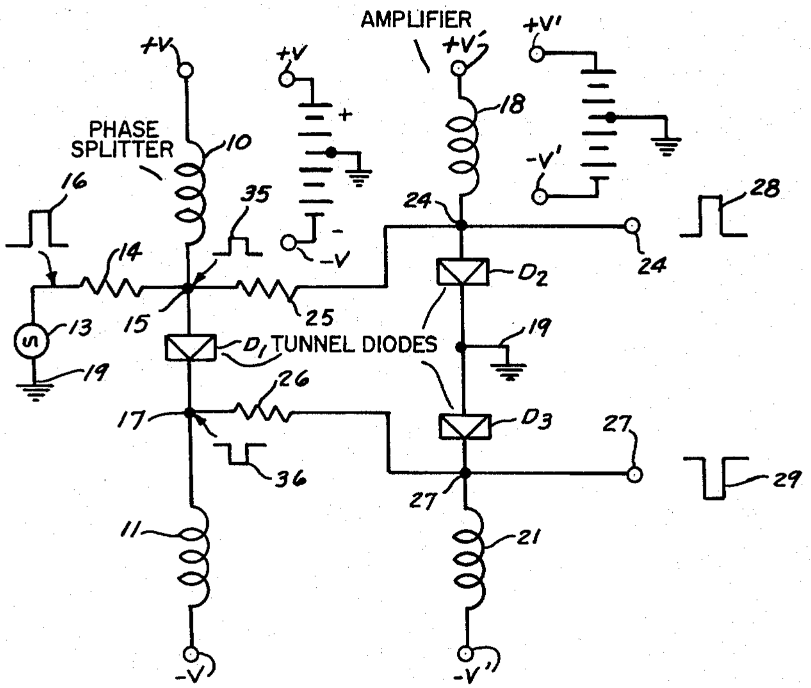
FIGURE 1 is a circuit diagram of a circuit constructed according to the invention.

FIGURE 1 shows opposite-polarity pulse generating means including a first series circuit comprising an inductor 10, a tunnel diode $D_1$ and a second inductor 11. A bias source, as indicated, is connected to provide positive and negative potentials to the terminals plus V and minus V of the series circuit. The bias source may include a centertap connected to ground or other suitable source of reference potential, and may be one which provides a substantially constant voltage to the series circuit.

A positive input pulse 16 from a source designated 13 is applied through a coupling resistor 14 to the junction point 15 between the positive side of diode $D_1$ and the inductor 10. According to an alternative arrangement, the source 13 may provide a negative pulse which is coupled to the negative side 17 of the diode $D_1$. The signal source 13 may itself be a tunnel diode circuit.

The pulse phase splitter circuit shown in FIGURE 1 also includes a second circuit including a third inductor 18, a second diode $D_2$, a ground connection 19, a third diode $D_3$ and a fourth inductor 21. A bias source supplies positive, reference, and negative voltages, as indicated, to the terminals plus V′, 19, and minus V′, respectively, of the second circuit.

The positive side 15 of the first tunnel diode $D_1$ is coupled through a resistor 25 to the positive side 24 of the second tunnel diode $D_2$, and the negative side 17 of the first tunnel diode $D_1$ is coupled through a resistor 26 to the negative side 27 of the tunnel diode $D_3$. Opposite polarity output pulses 28 and 29 are derived from the terminals 24 and 27. All of the diodes $D_1$, $D_2$ and $D_3$ are poled in the same direction of easy current flow relative to the bias voltages applied to the terminals plus V and minus V.

Figure 2:
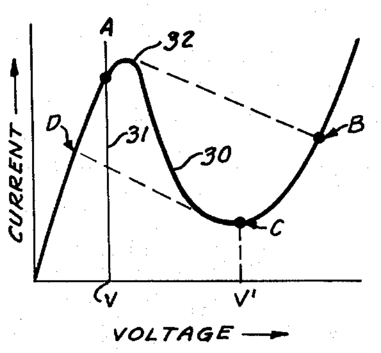
FIGURE 2 is a chart of the current-voltage characteristic of a tunnel diode which will be referred to in explaining the operation of the circuit of FIGURE 1.

The tunnel diode $D_1$ is biased in the low voltage positive resistance region of its current-voltage characteristic curve 30. As shown in FIGURE 2, the bias voltage is represented by the voltage V to provide a load line 31 which intersects the characteristic curve 30 at a point A in the low voltage positive resistance region of the characteristic curve. The tunnel diodes $D_2$ and $D_3$ are each similarly biased at a point in the low voltage, positive resistance region of the tunnel diode characteristic curve.

In the operation of the circuit of FIGURE 1, when a positive pulse 16 is applied to the positive side 15 of the tunnel diode $D_1$, the effective voltage across the diode $D_1$ is increased from the bias voltage value V shown in FIGURE 2. This increased voltage across the tunnel diode $D_1$ causes the operating point of the diode to move along the characteristic curve 30 to the peak value 32 from which the operating point switches rapidly to the point B on the high voltage positive resistance region of the characteristic curve 30. The speed with which the diode $D_1$ switches from point A to point B depends on the speed or rise time of the particular diode, and is determined primarily by the negative resistance characteristic of the diode in the region between 32 and C on the characteristic curve 30, and by the inherent capacitance of the diode.

The voltage across the diode $D_1$ thereafter decreases slightly as the energy stored in the inductors 10 and 11 is supplied to the diode. During this interval, the operating point on the characteristic curve 30 moves from the point B to C at a rate determined by the time constant of the inductors 10 and 11, and the varying effective resistance of the diode as represented by the varying slope of that portion of the curve between points B and C. Thereafter, the operating point moves rapidly through the negative resistance region of the diode from the point C to the point D, and then it returns more slowly to the initial point A. The operating point always returns to the point A because this is the only point where the characteristic curve 30 intersects the load line 31. The circuit is therefore monostable.

Figure 3:
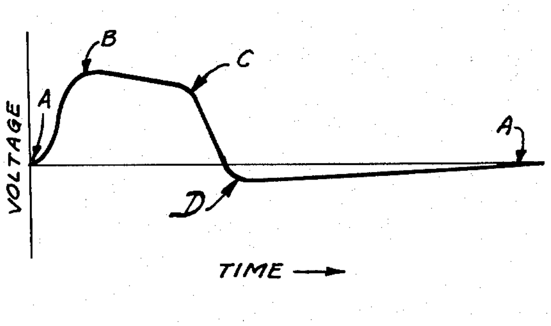
FIGURE 3 is a voltage waveform which will also be referred to in describing the operation of the circuit of FIGURE 1.

FIGURE 3 shows the voltage waveform at the positive side 15 of the tunnel diode $D_1$ which results from the switching operation described. The points A, B, C and D on the characteristic curve of FIGURE 2 correspond in time with the respectively designated points on the voltage-time waveform of FIGURE 3. The voltage waveform at the negative side 17 of the diode $D_1$ is the same as the waveform shown in FIGURE 3, but is of reversed or negative polarity. When the two output waveforms at the positive and negative terminals 15 and 17 of the diode $D_1$ are desired to be of equal amplitude, the inductors 10 and 11 are designed to provide the same inductance and the bias power supply connected to the plus V and minus V terminals is provided with a centertap connected to ground or a reference potential 19. Then, the symmetry of the circuit provides opposite polarity pulses of equal amplitude.

The portion of the circuit thus far described is receptive to an input pulse 16 of one polarity and is operative to provide two output pulses 35 and 36 of polarities opposite each other. Each output pulse 35 or 36 may have a waveform substantially the same as the waveform of the input pulse, or it may be different.

The output pulses 35 and 36 from the diode $D_1$ are amplified in the series circuit including diodes $D_2$ and $D_3$. The positive pulse 35 is coupled to the positive side 24 of the diode $D_2$, and the negative pulse 36 is coupled to the negative side 27 of the diode $D_3$, with the result that the pulses effectively increase the voltage across the diodes $D_2$ and $D_3$ and cause them to switch. The diodes $D_2$ and $D_3$ switch from a point on the low voltage positive resistance region of their characteristic curve to a point on the high voltage positive resistance region in a manner similar to that described in connection with the operation of diode $D_1$. The output pulses 28 and 29 available from the output terminals 24 and 27, therefore, have wave shapes and pulse widths determined by the values and characteristics of the circuit elements of the circuit including diodes $D_2$ and $D_3$. The operation of the circuits is such that the output pulses 35 and 36 from the diode $D_1$ may be of different width and shape compared with the input trigger pulse 16; and similarly, the output pulses 28 and 29 from the diodes $D_2$ and $D_3$ may be of different width and shape compared with the pulses 35 and 36 coupled to the diodes $D_2$ and $D_3$. However, the input pulse to a series circuit must not be narrower than the "rise time" of a diode in the series circuit.

Solely by way of example, output pulses 28 and 29 having a width of 20 nanoseconds and an amplitude of 400 millivolts may be provided from an input pulse 16 of 400 millivolts with circuit elements in FIGURE 4 having the following approximate values:

| | |
|---|---|
| Diode $D_1$ | 20 milliampere germanium diode. |
| Diodes $D_2$ and $D_3$ | 50 milliampere germanium diodes. |
| Inductors **10** and **11** | 0.1 microhenry. |
| Inductors **18** and **21** | 0.2 microhenry. |
| Resistor **14** | 100 ohms. |
| Resistors **25** and **26** | 20 ohms. |
| Voltage plus V | Plus 25 millivolts. |
| Voltage minus V | Minus 25 millivolts. |
| Voltage plus V′ | Plus 50 millivolts. |
| Voltage minus V′ | Minus 50 millivolts. |

A circuit according to FIGURE 1 using other values of circuit components can provide output pulses having a width in the order of one nanosecond.

The circuit of FIGURE 1 has been described, with reference to FIGURE 2, as one wherein the bias on the diodes is such as to provide a quiescent operating point A in the low voltage positive resistance region of the tunnel diode characteristic curve. According to an alternative arrangement, the bias on the tunnel diodes may be such as to quiescently bias the diodes at a point such as C on the high voltage positive resistance region of the characteristic.

In this case, the polarity of the input pulse 16 is reversed so that it tends to reduce the voltage across the diode, and thus causes the diode to switch from a point on its high voltage positive resistance region to a point on its low voltage positive resistance region, and back again. In this mode of operation, the input pulse causes the operating point to shift from point C, to point D, to point A, to point B, and then return to the quiescent point C. The scheme of biasing a tunnel diode at the point C may be described as biasing the diode in the valley of its characteristic curve. This biasing scheme can be applied to the series circuit including the diode $D_1$, or to the circuit including the diodes $D_2$ and $D_3$, or can be applied to both of the circuits. It is only necessary to arrange the polarity of input pulses so that they reduce the voltage across the diode or diodes in the circuit to which they are applied.

It is thus apparent that according to this invention there is provided an improved circuit including tunnel diodes, the circuit being one capable of operation at very high speeds in translating an input signal of one polarity to two output signals of polarity opposite to each other.

What is claimed is:

1. A circuit comprising a series circuit including a first impedance, a first negative resistance diode having a positive side and a negative side, and a second impedance, said diode being connected between said impedances, said series circuit having end terminals for the connection of positive and negative potentials to bias said diode monostably, means coupling an input signal to said diode, a second circuit including a third impedance, second and third negative resistance diodes and a fourth impedance connected to each other in the named order, said second and third negative resistance diodes each having a positive side and a negative side, said second circuit having end terminals for the connection of bias potentials, means coupling the positive side of the first diode to the positive side of the second diode, means coupling the negative side of the first diode to the negative side of the third diode, and means to derive two opposite polarity signals from said second and third diodes.

2. A pulse circuit comprising a series circuit including a first inductor, a tunnel diode, and a second inductor, said diode being connected between said inductors, a grounded centertap bias power supply having positive and negative terminals connected across said series circuit to bias said diode monostably, means coupling an input pulse to said diode, and means to derive two substantially equal magnitude but opposite polarity output pulses from opposite sides of said diode.

3. A circuit comprising a series circuit including a first inductor, a negative resistance diode having two positive resistance operating regions, and a second inductor, said diode being connected between said inductors, means to connect positive and negative potentials, relative to a reference potential, across said series circuit to bias the diode monostably in one of said positive resistance operating regions, means coupling an input pulse to said diode, whereby said diode switches from one of said positive resistance regions to the other and back again, and means to derive two substantially equal magnitude but opposite polarity output pulses from opposite sides of said diode.

4. A pulse circuit comprising a series circuit including a first inductor, a first negative resistance diode having two positive resistance operating regions, and a second inductor, said diode having a positive side and a negative side and being connected between said inductors, means to apply positive and negative potentials, relative to a reference potential, across said series circuit to bias the diode monostably in one of said positive resistance regions of its characteristic curve, means coupling an input pulse to said diode, whereby said diode switches from said one positive resistance region to the other of said regions and back again, a second circuit including a third inductor, second and third negative resistance diodes and a fourth inductor connected to each other in the named order, said second and third negative resistance diodes each having a positive side and a negative side, means to apply positive and negative potentials, relative to a reference potential, across said second circuit, means coupling the positive side of the first diode to the positive side of the second diode, means coupling the negative side of the first diode to the negative side of the third diode, and means to derive two opposite polarity output pulses from said second and third diodes.

5. A pulse circuit comprising a series circuit including a first inductor, a negative resistance diode having two positive resistance operating regions, a junction point, and a second inductor, said diode being connected between said inductors, said diode and one of said inductors being connected to said junction point, said series circuit having terminals for the connection of a power supply supplying positive and negative potentials, relative to a reference potential, across said series circuit to bias said diode monostably in one of said positive resistance regions of its characteristic curve, means coupling an input pulse to said junction point between said diode and one of said inductors, said input pulse having a polarity to switch said diode to the other of said positive resistance regions and back again, and means to derive two substantially equal magnitude but opposite polarity output pulses from opposite sides of said diode.

6. A pulse circuit comprising a series circuit including a first inductor, a tunnel diode having two positive resistance operating regions, a junction point, and a second inductor, said diode being connected between said inductors, said diode and one of said inductors being connected to said junction point, a centertap grounded power supply having positive and negative terminals connected across said series circuit to bias said diode monostably in one of said positive resistance regions of its characteristic curve, means coupling an input pulse to said junction point, said input pulse having a polarity to switch the diode to the other of said positive resistance regions and back again, and means to derive two substantially equal magnitude but opposite polarity output pulses from opposite sides of said diode.

7. A pulse circuit comprising a series circuit including a first inductor having high and low voltage positive resistance operating regions, a junction point, a negative resistance diode, and a second inductor, said diode being connected between said inductors, said diode and one of said inductors being connected to said junction point, a power supply having positive and negative terminals, relative to a reference potential, connected across said series circuit to bias said diode monostably in said low voltage positive resistance regions, means coupling an input pulse to said junction point, said input pulse having a polarity to increase the voltage across said diode, whereby said diode switches to said high voltage positive resistance region and back again, and means to derive two substantially equal magnitude but opposite polarity output pulses from opposite sides of said diode.

8. A pulse circuit comprising a series circuit including a first inductor, a negative resistance diode having high and low voltage resistance operating regions, a junction point, and a second inductor, said diode being connected between said inductors, said diode and one of said inductors being connected to said junction point, a power supply having positive and negative terminals, relative to a reference potential, connected across said series circuit to bias said diode monostably in said high voltage positive resistance region, means coupling an input pulse to said junction point, said input pulse having a polarity to reduce the voltage across said diode, whereby said diode switches to said low voltage positive resistance region and back again, and means to drive two substantially equal magnitude but opposite polarity output pulses from opposite sides of said diode.

9. A circuit comprising a first bias potential terminal, a first inductor, a first negative resistance diode, a junction point, a second negative resistance diode, a second inductor, and a second bias potential terminal, said elements being connected in a manner to permit a flow of current through the elements in the order named from one bias potential terminal to the other.

10. A circuit comprising a first inductor, first and second negative resistance diodes with unlike electrodes connected and a second inductor, all said elements being connected in the order named, said circuit having end terminals for the connection of positive and negative bias potentials.

References Cited in the file of this patent

UNITED STATES PATENTS

| | | |
|---|---|---|
| 2,522,402 | Robertson | Sept. 12, 1950 |
| 2,585,571 | Mohr | Feb. 12, 1952 |
| 2,975,377 | Price | Mar. 14, 1961 |

OTHER REFERENCES

Article, "Tunnel Diode Logic Circuits," by W. F. Chow, Electronics, June 24, 1960.

UNITED STATES PATENT OFFICE

CERTIFICATE OF CORRECTION

Patent No. 3,173,021 March 9, 1965

Richard H. Bergman

It is hereby certified that error appears in the above numbered patent requiring correction and that the said Letters Patent should read as corrected below.

Column 6, line 1, after "inductor" insert a comma; same column 6, lines 1 and 2, strike out "having high and low voltag positive resistance operating regions, a junction point,"; same column 6, line 3, after "diode", first occurrence, insert -- having high and low voltage positive resistance operating regions, a junction point --.

Signed and sealed this 27th day of July 1965.

(SEAL)
Attest:

ERNEST W. SWIDER
Attesting Officer

EDWARD J. BRENNER
Commissioner of Patents